ial. The concentration soon arrives at a point where
United States Patent Office 2,960,331
Patented Nov. 15, 1960

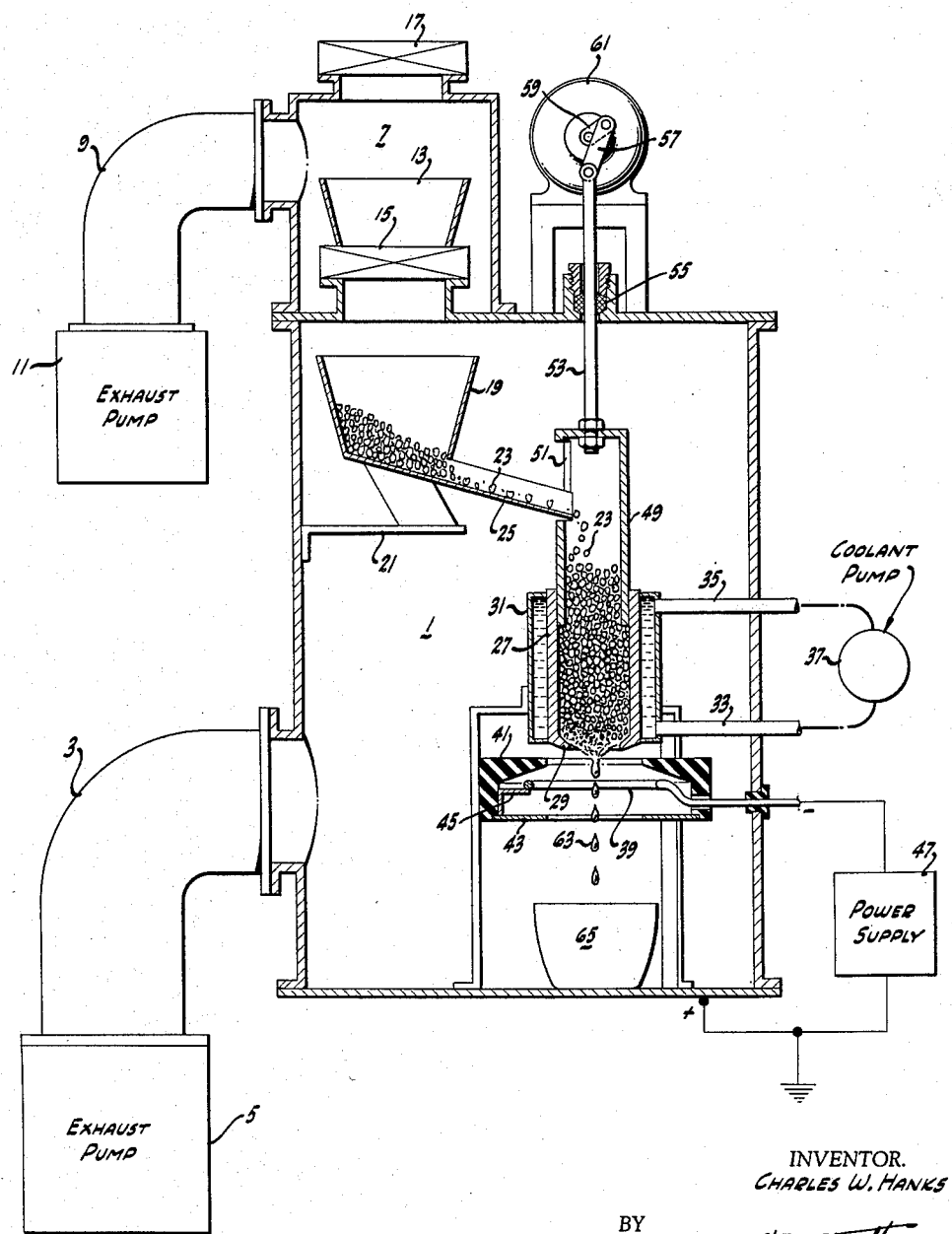

2,960,331

VACUUM MELTING PROCESS

Charles W. Hanks, Orinda, Calif., assignor, by mesne assignments, to Stauffer Chemical Company, New York, N.Y., a corporation of Delaware Filed Nov. 29, 1956, Ser. No. 625,035

5 Claims. (Cl. 266—34)

This invention relates to the melting and purifying, in vacuo, of metals that are ordinarily supplied in particle or divided form, such as powders, pellets, or sponges. The particles referred to can be of widely varying sizes, ranging upward from almost impalpable powders to lumps as big as a walnut or even larger, as long as they are small enough to be handled satisfactorily by conveyors or to flow, by gravity, through pipes.

A number of the metals that have only quite recently come into commercial use and are highly refractory are normally supplied in such forms by the primary refiner. Illustrative of metals of this latter class are titanium and zirconium. The invention finds its greatest utility in operating upon these and other hard-to-handle metals and will accordingly be described in connection therewith, but it should become apparent in the course of this specification the utility of the invention is not limited to these less common metals, but may be employed with any metal the utility of which is enhanced sufficiently by vacuum melting to warrant the use of such processes.

Vacuum melting is employed principally for one or both of two reasons. The metal may have so great a chemical affinity for the gases of the atmosphere, particularly at its fusion temperature, that it can only be maintained in its fused state with a reasonable degree of purity by such a process and an attempt to melt it in air would result in a conflagration or even an explosion, or it may, even in the absence of an affinity as powerful as this, adsorb the gases to which it is exposed and outgasing by melting in vacuo may improve its electrical or mechanical properties. The high temperatures to which the metals in this latter category are subjected drive off the adsorbed gases more and more completely as the temperature of fusion is approached and finally reached and the gases thus evolved are removed by the vacuum equipment so that they are not recombined or re-adsorbed as the melted material re-solidifies.

Certain other impurities besides the fixed (or "non-condensable") gases can be removed by vacuum melting. One of the most important of these and sometimes the most troublesome is water. This, like the fixed gases, can be adsorbed in the vapor phase, vaporized in the melting process and drawn off by the vacuum system together with the fixed gases. The reason that it is troublesome is that instead of being evolved gradually and uniformly it may collect beneath the surface at which melting occurs until the vapor pressure rises to the point where it is released explosively, causing sputtering or instability in the melting process, particularly if the latter is effected by means of an electrical discharge to the melting surface. This is most likely to occur in relatively low-temperature operations. With the more refractory metals water vapor acts like a non-condensable gas.

Still another type of impurity frequently found in crude materials of the class described includes materials that are solid at ordinary temperatures but which volatilize at or below the temperature of fusion of the metal being treated. The most common materials of this class are halides of the alkalies or alkaline earths, principally the chlorides of sodium and magnesium. These materials may cause troubles similar to those due to water vapor but they have characteristics that produce additional difficulties that will be discussed more fully hereinafter.

In vacuum melting processes the heat of fusion is almost universally supplied electrically. With massive materials this can be done satisfactorily by induction heating. With materials in particle form, however, the resistance of the divided metal is so high that induction heating is usually uneconomical and the preferred method is the bombardment of the material to be melted by an electrical discharge. In certain instances this may be an arc discharge but there are material advantages to be gained by using a substantially pure electronic discharge in the actual bombardment. The most economical way of employing this latter technique is to maintain the electrol discharge through a cloud of ions, which neutralizes, in part, the space charge that tends to limit electron flow. With this method of bombardment a glow discharge is maintained in the discharging region. The discharge is stable as long as the vacuum is maintained at substantially constant value within the discharge path, preferably of the order of magnitude of one micron of mercury pressure or less. If, however, there is a sudden evolution of material in the gas phase into the discharge region the pressure may rise, locally, to a value permitting the formation of a "hard core" arc wherein the material under bombardment is vaporized, ionization by collision occurs within the vapor, the voltage across the discharge path falls and the current rises enormously, bringing into play circuit breakers or other protective devices employed and interrupting the continuous process. Any gaseous substance such as $H_2$, argon, $N_2$, water vapor, vaporized solid material, etc. can cause such explosive effects.

A method has heretofore been described for preventing such instability which is effective and satisfactory where the impurities in the material melted are water vapor or the fixed gases. In accordance with this previously described method the particles of metal are forced through an open-ended duct and exposed to the electronic bombardment as they emerge from the open end, which faces generally upward and is either horizontal or at most inclined at a moderate angle to the horizontal. A molten zone of metal is formed at the open end of the duct, forming a liquid seal that prevents the escape of the evolved gases into the discharge path, and the melted metal drips off, forced by the metal as it is advanced from the rear. The surface tension of the molten metal will hold the seal intact, even with fairly large inclinations of the open end of the duct.

The evolution of gas takes place behind the seal, either before or at the surface, within the duct, where actual melting occurs. The evolved gas escapes from the input end of the duct, also maintained under vacuum, and does not enter the discharge path to cause instability therein.

While the operation thus described is highly effective with the fixed gases or with water vapor (since the latter is substantially "non-condensable" at the temperatures and pressures employed) it fails with solid impurities. These impurities cannot escape until they are volatilized, which occurs close to the zone of melting. As long as the seal remains intact the volatilized impurities can escape only toward the rear, where they condense upon striking the cooler, advancing material. Having condensed, they are again carried forward with the incoming material, recycling and repeating the process. The concentration of impurities builds up in the zone wherein the melting is occurring and immediately behind it, theoretically without limit, actually to a value many times that in the raw material. The concentration soon arrives at a point where the amount of evolved vapor and the pressure engendered by it can no longer be held by the surface tension of the liquid layer and the result is a minor explosion which causes spattering of the metal as well as the instantaneous increase of pressure in the discharge path referred to above. Experience indicates that spattering occurs when the concentration of condensable impurities exceeds about 0.3%. The spattered metal builds up on the structures surrounding the discharge path, warping the electrical field, interfering with the discharge, and soon requiring a shut-down to permit cleaning of the apparatus.

The objects of the present invention include the provision of a method, and of an apparatus for performing it, that prevent eruptive, discontinuous evolution of gas or vapor into the path of a discharge effecting the melting of materials in particle form, and that is effective irrespective of whether the impurities tending to cause such discharges are gaseous or solid at normal temperatures. Viewed from another aspect, an object of the invention is to provide a method and apparatus for maintaining a primarily electronic discharge for the continuous-process melting of materials that are supplied in particle form and which contain either gaseous or solid impurities. Still another object of the invention is to provide a method of and apparatus for the vacuum melting of refractory metals which is particularly effective in the production of metals of high purity from raw materials containing either solid or gaseous contaminants. Other objects and advantages of the invention will become apparent in the course of the descriptions which follow.

In accordance with the method of the present invention a flow of the particles of metal is continuously supplied to a melting zone that is established in a plane so disposed that metal melted therein will immediately drain away, i.e., the melting zone either faces generally downward or at least is inclined so steeply that the surface tension of the melted metal is incapable of maintaining an unbroken liquid layer which could act as a seal. An electrical discharge is directed against the metal reaching the melting zone to cause the melting. The particles to be melted are forced into the melting zone against a restraining force, which can be applied by constricting their flow or, in some cases, merely by friction. Under such circumstances larger particles or lumps will jam in any case, so that they will not fall through the melting zone before melting occurs. In addition, however, the force applied, together with the heat conducted and radiated into the advancing material, causes sintering of the particles, irrespective of their size, to form a solid and more or less porous mass from which the metal will not fall until actually molten. It is usually of advantage to cool the advancing material immediately behind the molten and sintering zones, so that there is a steep temperature gradient in the latter.

What occurs at the melting face of the advancing mass depends in some degree upon its degree of porosity. In vacua as high as those employed in the process described the course of the molecules of vaporized impurities cannot be treated as fluid flow but as a statistical diffusion problem. The included molecules released from the surface of the material as it melts travel in random directions at velocities that depend on their thermal energies. Those emitted forwardly from the surface into the electrical discharge have mean free paths so long that there is a large probability that they will escape entirely and be removed by the vacuum system. Those emitted rearwardly into voids in the advancing mass have a high probability of rebounding within the voids and escaping almost immediately, particularly where the voids are small, as in the case of a compacted and sintered powder.

With larger interconnected voids, as in sintered sponge, there is a greater probability that the released vapor molecules will be entrapped in the voids, to be again carried forward and re-emitted together with those newly released in melting, this recycling adding to the effective concentration of condensable impurities in the metal.

If the face of the unmelted particles were plane and no part of it were sealed by gathering drops of liquid it is obvious that the proportion of entrapped molecules could not exceed one-half, in which case the recycling could at most result in doubling the effective concentration of impurities. In practice the surface becomes deeply pitted and a portion of the melted surface is sealed by drops. The first of these effects reduces the probability of molecule entrapment, the latter increases it. Even when using sponge the increase in effective concentration of impurities appears to be less than 100% although at the present this can be no more than an estimate. The important fact is that sponge metal containing up to about 0.3% of condensable impurities can be melted successfully with this method, whereas even a trace of such impurity can cause spattering where there is an intact liquid seal to produce indefinite recycling to the point where explosive release occurs.

In a preferred form of apparatus for carrying out the method of the present invention, the material to be treated, instead of being fed through a horizontal duct toward an upwardly directed discharge opening where it is melted, is supplied to the top of an open-ended, downwardly directed feed-tube, with its open end also facing downward so that molten metal will immediately drain or drip clear of the opening. Means are mounted opposite the open end of the feed-tube for directing an electrical discharge directly toward the center of the opening, these means preferably comprising an annular, electron emitting cathode, substantially coaxial with the opening, and an electrode partially surrounding the cathode for focusing the emitted electrons on the desired spot. Connection is made between the cathode and the material within the feed-tube for establishing the discharge for melting the material, and in most cases it is desirable that the lower end of the feed-tube be slightly constricted by a small, inwardly projecting flange. Means are provided at the upper end of the feed-tube for compacting the material within it. The most convenient such means comprises a reciprocating tamper. This can be tubular and of such dimension that it slides readily within the feed-tube or it can take the form of a solid ram-rod reciprocating substantially at the axis of the tube. All of the apparatus described is, of course, contained within a vacuum tank or its equivalent, connected to a pump system of sufficient capacity to hold the pressure within the tank down to a value of the order of one micron or less in spite of the maximum amount of gas to be expected from the raw material used. Preferably means are provided for cooling the lower end of the feed-tube, adjacent to its outlet opening at the point where the electrical discharge takes place.

In the single figure of the drawing which illustrates apparatus embodying the present invention, conventional portions of the equipment are illustrated schematically while those portions which are specifically related to the invention are shown in sufficient detail to illustrate their actual mode of operation.

In the drawing there is shown, schematically, a substantially conventional vacuum tank 1, connecting through an exhaust duct 3 with an exhaust pump or pumps 5. Since the material to be treated within the tank evolves gases during the treatment the lumen of the exhaust duct should be large in comparison to the size of the tank and the pump 5 should have sufficient capacity to maintain the general level of vacuum within the tank at its desired value, preferably at a pressure in the neighborhood of 0.5 micron of mercury or less in spite of such evolution of gas.

Mounted above the tank is a vacuum lock 7, preferably provided with its own exhaust duct 9 and pump 11, although it may be connected to the general vacuum pump system. Within the vacuum lock there is shown a feed-hopper 13, the bottom of which opens into the main vacuum tank 1 through an externally operated port or valve 15. A similar port or valve 17, mounted in the top of the vacuum lock above the hopper, permits the hopper to be filled periodically without breaking the vacuum within the tank 1. To accomplish this the valve 17 is open and the hopper filled, following which the valve 17 is closed and the lock exhausted until the pressure within the lock is reduced substantially to that within the tank. The valve 15 is opened, dumping the material within the hopper into a conventional vibratory feed apparatus 19, mounted on a bracket 21 immediately below the hopper. Such arrangements for feeding continuous processes in vacuo are well known and need not be described in detail; they are shown merely as typical methods of supplying the apparatus with which the present invention is particularly concerned.

As has already been stated, the material that is to be operated upon in this apparatus is in particle form. This includes powders, granules, pellets or lumps, and the lumps themselves can be either solid, or in the case of some of the materials for which the invention is especially valuable, such as titanium, they can be of metallic sponge. In whichever of these forms, the charge introduced into the hopper 13 will contain large amounts of included air, some of it adsorbed, some of it in the interstices between or within the particles. Before the charge is dumped into the feeder 19, however, the interstitial air will have been removed by the pump 11, leaving within the material discharged from the feeder only such gases or other impurities as have been adsorbed by, dissolved in, or otherwise so completely distributed through the solid portions of the metal itself that they cannot be removed by the evacuation process conducted within the vacuum lock.

The particles of material to be treated, designated in the drawing by the reference character 23, rid of free gas, fall from the end of feed chute 25 of the feeder into the top of a feed-tube 27. The feed-tube is preferably mounted in an upright position substantially vertical, although it need not be so provided it slopes downwardly sufficiently to prevent molten metal from running back into the tube. The lower end of the tube is open, but is preferably slightly constricted by an inwardly turned flange 29 surrounding the opening. Whether or not this flange is necessary depends upon the coefficient of friction of the material within the feed-tube against the walls of the tube. In the preferred form of the apparatus used, the feed-tube itself is of copper and is surrounded by a copper jacket 31 through which a coolant is circulated, via an inlet duct 33, an outlet duct 35, by means of a circulating pump 37. If water is used as the coolant the pump may be unnecessary, water being supplied continuously from a commercial source.

The use of the water-jacket, while preferred, is not a necessary feature of the invention, provided the feed-tube is made of a material that is much more refractory than the metal to be melted. It may be made of insulating material, in which event the coefficient of friction between the material supplied and the feed-tube may be sufficient to prevent the material falling through the tube as rapidly as it is fed, even in the absence of inturned flange 29, but in general the use of the flange is preferred if merely as a precautionary measure.

An electron-emitting cathode is mounted immediately below the open end of the feed-tube and is surrounded with a shield for focusing the electrons emitted by it upon the material within the end of the tube. In the preferred form of the apparatus the cathode is of annular form and is mounted coaxially with the opening of the feed-tube itself. As shown, the cathode comprises a single turn of heavy tungsten wire or rod 39, and the focusing shield is in the form of an annular channel having flanges 41 projecting inwardly over the cathode and 43 similarly projecting below it, leaving a central opening through which material melted by the discharge may drop. The material of the shield may be metal, in which case it is connected to the cathode circuit so that it operates at substantially cathode potential. In the case shown it is made of one of the insulating refractories, such as electrical porcelain, sillimanite, or sintered steatite, and the cathode is supported from the shield by brackets 45 extending inwardly from the periphery of the shield. Whether the shield is conducting or insulating its effect is substantially the same, for if it is insulating it almost immediately acquires a charge from the electrons emitted from the cathode, which brings its surface effectively to cathode potential, or a little negative thereto, with the difference from the cathode potential attributable to the maximum velocity, in electron volts, with which thermal emission from the cathode occurs.

During the periods of operation, the cathode operates at a potential anywhere between a few hundred and a few thousand volts negative to the material within the feed-tube, voltages within the range above 1000 being preferred. Most conveniently, the feed-tube and the material that it contains are electrically connected directly to the tank 1, which is grounded. The negative voltage for the cathode is in this case supplied by a conventional D.C. power supply 47, this supply including, as is usual in such cases, a transformer winding which supplies alternating current for heating the cathode. It is possible to use alternating current in the discharge itself, the discharge taking place only when the cathode is negative to the material in the feed-tube. This latter arrangement is only possible, however, when the material to be treated is a poor emitter of electrons at its temperature of fusion. With the material to which the invention particularly applies this is not generally the case. Reverse bombardment can lead to quick destruction of the cathode and for this reason the provision of a high voltage D.C. power supply is almost always economically desirable.

A reciprocating tamper 49 extends into the feed-tube from above. In the preferred form of the apparatus shown in the drawing, the tamper comprises a piece of heavy-walled steel tubing that projects well within the upper end of the feed-tube at the upper limit of its reciprocating motion. An opening or slot 51 in the side wall of the tubing admits the discharge chute 25 of the vibratory feeder so that the material discharged falls down within the tamper into the feed-tube. The upper end of the tubing of which the tamper is formed is closed and an operating shaft 53 connects to this upper end, the shaft extending through a conventional shaft seal 55 at the top of the tank 1. Outside of the tank a connecting-rod 57 couples it to a crank 59, driven by a suitable motor 61, to impart the reciprocating tamping motion to the tamper. The latter operates continuously as long as the apparatus is functioning. It would obviously be possible to use a solid, centrally-mounted tamper, but in general this does not result in as uniform a feed.

In starting operations with this apparatus it is usually necessary initially to block the lower end of the feed-tube with a disc which is preferably a piece of previously purified metal of the kind being melted. This disc prevents the particles from falling freely through the feed-tube in the initial stages of the operation. After the necessary degree of vacuum within the tank has been attained the power-supply circuits are closed and the discharge takes place, concentrated on the center of the temporary closure disc. The central portion of the disc surface first melts, the molten material falling away in drops 63 into a suitable receptacle which may, for example, be the input of a continuous ingot-casting mold but which, since it is not a part of the present invention, is illustrated merely as a crucible. That the center of the disc melts first is both because it is to this point that the electrons of the discharge are principally directed and because the edges of the disc are cooled by contact with the walls of the feed-tube. Above and surrounding the zone where the material in the opening is actually liquid there is a zone which may be referred to as the sintering zone, where it is somewhat plastic, being raised to sintering temperature by conduction and radiation from the molten zone. Above the sintering zone there is a falling temperature gradient, up to the top of the column of material within the feed-tube where the temperature of the material is substantially that of its surroundings.

The constantly repeated blows of the tamper tend to force material from above into the sintering zone. Each time the tamper rises some of the material previously within it falls outwardly to the wall of the feed-tube and when the tamper falls it forces the material thus newly fallen downwardly toward the sintering zone. A relatively short distance below the limit of the downward stroke of the tamper the force that it exerts is distributed approximately uniformly across the entire cross-section of the feed-tube and since it is at the center of the column of the material that the hottest spot forms it is in the center of the column that the sintering zone is the thickest, the material most plastic. Above the surface the constant tamping consolidates and welds the particles of material into a plug that blocks the outlet opening and advances only as melting occurs. Non-condensable, adsorbed gases are liberated before sintering temperature is reached, and if the particles are fine the plug may be practically homogeneous. Where sponge is used as raw material the plug usually remains porous. Using sponge metal and a 3 in. diameter feed-tube of substantially the form shown it has been found that the sintered zone is somewhat lenticular in form from ½ in. to 1 in. thick in the center, and tapering in thickness toward the edges. This sintered plug continues to be extruded through the opening and the operation continues in substantially the same manner as at the start, the truly gaseous impurities being liberated mainly above the sintering zone and withdrawn by the vacuum equipment through the aperture 51 and never reaching the discharge path.

The normally solid but volatile impurities that cause difficulties when they occur in materials treated in the previously described process do not escape by this rearward route, which would cause their cumulative recondensation, recycling, and concentration. The chlorides of sodium and magnesium, which form the bulk of such impurities, occur distributed substantially uniformly through the solid material, of which they form an extremely small percentage. They cannot escape from the material in which they are entrapped until the latter becomes an actual liquid. Sintering is defined, as used in the present context, as a welding of particles by heat and pressure and is well known to occur at temperatures below that at which the sintered material will melt. Therefore, the solid impurities remain, still entrapped and still substantially uniformly distributed, until they reach the zone where the final melting occurs. The molten zone extends farther and farther toward the edge of the feed-tube as the plug advances exposing a relatively large liquid surface from which these materials can now volatilize. The surface tension of the metals is high and it does not fall until it has run down toward the lowest solid portion of the exposed surface and gathered in relatively large drops, the flow, as it occurs, exposing new surface. Any projection from the surface, liquid or solid, results in a field concentration that tends to attract electrons and cause a local concentration of energy and melting, so that when a drop falls it usually leaves a hollow, causing the discharge to concentrate on a new projection. New surface is constantly being exposed from which the volatilized impurities are released without spattering but at a substantially uniform rate that maintains the pressure within the electrical discharge path substantially constant and somewhat above the average pressure within the tank 1. The volatilized impurities dissociate in the discharge and help to maintain a cloud of ions that partially neutralizes the space charge and converts the discharge as a whole into one of the glow type which has proved most satisfactory for the type of operation described but does not conduce to the formation of an unstable, "hard core" arc.

The treatment shown also prevents explosive release of water vapor into the discharge path, but through a different mechanism. Any water found in metallic powders or sponges is not, like the solid impurities referred to, normally distributed throughout the particles themselves but is held by adsorption on their surfaces. If the material treated is zirconium power, which must be handled wet if exposed to the atmosphere, the major portion of the water is removed by the preliminary evacuation in the vacuum lock or some similar drying process before it is introduced into the main vacuum tank. What remains is merely an adsorbed layer on the surface. Being on the surface, and because the vapor pressure of water at all temperatures is much higher than that of the solid impurities it is released from the particles treated long before they reach the temperature required for sintering. At the temperatures and pressures effective within the column of material inside the feed-tube there is no tendency to recondense and concentrate, so that under the conditions of operation water is in fact one of the "non-condensable gases." The amount of water vapor liberated into the discharge path, if any, is so minute as to be entirely negligible and not a cause of spattering.

It should be apparent from the foregoing that while the apparatus described is well adapted to perform the method of the present invention and is at present believed to be the best form for the purpose, it is not by any means the only apparatus that can be used to accomplish this end. The most critical features of the method are that the melting surface is so positioned that the metal drains or drops off as fast as it melts and that the divided material to be treated is advanced as a confined flow through a region of continuously rising temperature gradient and is subjected to forces sufficient at least to jam it and preferably sinter it so that the particles do not fall through the discharge without melting. The readiest method of applying the rising temperature gradient that releases the fixed gases held by the divided material is by conduction from the discharge end of the advancing column where final melting takes place and the readiest means of applying the necessary pressure to consolidate and sinter the advancing material is by cooling and constricting the orifice through which the material emerges so that the periphery of the column at its point of emergence is not liquid but plastic and some actual extrusion (as distinguished from liquid flow) occurs at the point of emergence. It is well known that when an attempt is made to force lumps of material through a passage through which they could individually pass readily they tend to jam, especially if they are of irregular shape and if the walls of the passage have a high coefficient of friction to provide an initial retarding force. Therefore with some kinds of raw metal, such as fragments of metal sponge, neither the cooling of the feed-tube, the constriction of its output end, nor the sintering operation itself is an essential feature of the invention, each considered by itself. An unglazed ceramic feed-tube, without cooling constriction, can supply sufficient retarding friction to cause jamming of the lumps, but in such a feed-tube the temperature gradient is so low that the sintered zone will be much thicker than with a cooled metal feed-tube. Conversely, with a cooled feed-tube and very porous sponge, of low thermal conductivity, the sintering zone may practically merge with the melting zone. Some materials, therefore, require neither all of the steps of the method nor the apparatus to perform it that are required by others. The apparatus used may be entirely different from that here described; instead of performing the consolidation by tamping, a screw feed can be employed, on much the same principle as in a household or butcher's meatgrinder. The feed may be nearly horizontal instead of vertically downward, the melting zone may be vertical instead of facing directly downward. The use of various types of restraint to build up the pressure that effects jamming or sintering of the material has already been discussed. In handling materials containing only gaseous impurities the earlier process is to be preferred simply because it requires less power in the feed mechanism to force the unconsolidated material through the free end of the column, and a less powerful vacuum system to keep the degree of vacuum in the electrical discharge path as high as is desired. The form of apparatus here shown has the advantages that it will handle raw materials that either do or do not contain condensable impurities and of any degree of fineness, from large lumps down to the finest powders. Within their particular fields of use, therefore, both methods have their particular advantages. The apparatus shown in the drawing is illustrative and is believed to be novel, but the scope of the invention is that expressed in the following claims.

What is claimed is as follows:

1. Apparatus, for use within an evacuated container, for melting metals supplied in particle form, comprising a substantially vertical feed-tube having an intake opening and having an open lower end forming a downwardly directed discharge opening, said lower end being of constricted inside diameter forming an interior shoulder within said feed-tube adjacent to said discharge opening, means for downwardly feeding particles of metal to be melted through said feed-tube, a thermionic cathode adjacent to said discharge opening, means for directing an electrical discharge from said cathode toward the face of the metal as it emerges from the discharge opening of said feed-tube to melt the emerging metal and cause it to drip away from said opening, and means for applying downward pressure to said particles of metal immediately above and heated by conduction from the melting metal to cause sintering of said particles to form a plug supported within the feed-tube by said interior shoulder and blocking said discharge opening and to force said plug through said opening as the face of said plug is melted.

2. Apparatus for use within an evacuated container for melting metals supplied in particle form comprising a feed-tube having an intake opening and a generally downwardly directed discharge opening defining a rectilinear path through which said metal particles will travel, means carried by said tube and projecting into said path at said discharge opening to define a constriction formed in said feed tube surrounding said discharge opening, means for maintaining a continuous flow of particles of metal to be melted through said feed-tube, an annular, thermionic cathode below said discharge opening, means for directing an electrical discharge from said cathode upon the face of the metal emerging from the discharge opening of said feed-tube to melt the emerging metal and cause it to drip away from said opening and fall through said annular cathode, and means for applying pressure to the particles of metal heated by the melting face thereof to cause sintering of said particles to form a plug blocking said discharge opening and force said plug through said constriction as the face of said plug is melted.

3. Apparatus in accordance with claim 2 including means for cooling the portion of said feed-tube adjacent said means projecting into said path.

4. Apparatus for use within an evacuated container for melting metals supplied in particle form comprising a feed-tube directed generally downward to permit gravity feed therethrough and having an intake opening at its upper end and a discharge opening defining a rectilinear path through which said metal particles will travel, means carried by said tube and projecting into said path at said discharge opening to define at the lower end thereof a constriction formed at the end of said feed-tube surrounding said discharge opening, means for maintaining a continuous flow of particles of metal to be melted into said feed-tube, a thermionic cathode adjacent to said discharge opening, means for directing an electrical discharge from said cathode upon the face of the metal emerging from said feed-tube through said constriction to melt the emerging metal and cause it to drip away from said opening, a tamper having one end extending downwardly into said feed-tube through said input opening, and driving means for oscillating said tamper within said feed-tube to compress only the peripheral portions of particles of metal below it that have been heated by the melting metal and cause sintering thereof to form a plug blocking said discharge opening and to force said plug through said constriction as the face of said plug is melted.

5. Apparatus in accordance with claim 4 wherein said tamper comprises an open ended tube slidably mounted within said feed tube, the particles of metal to be melted being supplied to said feed tube through the open end of said tamper remote from said one end thereof.

References Cited in the file of this patent

UNITED STATES PATENTS

| 917,257 | Critchlow | Apr. 6, 1909 |
| 1,679,582 | Nelson | Aug. 7, 1928 |
| 2,640,860 | Herres | June 2, 1953 |
| 2,686,822 | Evans et al. | Aug. 17, 1954 |
| 2,709,842 | Findlay | June 7, 1955 |
| 2,727,937 | Boyer | Dec. 20, 1955 |
| 2,858,586 | Brennan | Nov. 4, 1958 |

FOREIGN PATENTS

| 529,544 | Great Britain | Nov. 22, 1940 |